June 8, 1954 P. C. WAITE Re. 23,837

RUG

Original Filed Sept. 17, 1949

INVENTOR.
Philip C. Waite
BY
Banning & Banning
Attys.

Reissued June 8, 1954

Re. 23,837

UNITED STATES PATENT OFFICE 23,837

RUG

Philip C. Waite, Oshkosh, Wis., assignor to Waite Carpet Company, a corporation of Wisconsin Original No. 2,583,192, dated January 22, 1952, Serial No. 116,280, September 17, 1949. Application for reissue December 17, 1952, Serial No. 326,616

5 Claims. (Cl. 28—80)

Matter enclosed in heavy brackets [ ] appears in the original patent but forms no part of this reissue specification; matter printed in italics indicates the additions made by reissue.

This invention relates to a floor covering such as a rug. It will be convenient in the ensuing description to use the term "rug," with the understanding that it applies equally to floor or wall coverings of the same general character.

The rug chosen as an exemplification of this invention is of the so-called tufted variety. This comprises a backing, usually of canvas, to which short lengths of yarn are anchored to stand out upon the face of the rug either in the form of loops or a pile. Such rugs have acquired a wide popularity at the present time, but are somewhat deficient from the standpoint of appearance. The coloring possibilities, when the usual dyes are employed, are rather limited. In addition, such a rug, when produced from cotton yarn which is the most common, usually comes in plain colors. Any such rug will show footprints more readily, and is very susceptible to matting. Deficiencies such as these are eliminated in the present rug in which a subtle pattern may be produced to improve its appearance and to disguise in large part the matting or wear that is usually so apparent in a plain, all-over color. The wearing and utility value of a rug produced according to this invention is accordingly enhanced because of its improved and different design or texture.

These and various other advantages and objects are realized in a rug constructed according to this invention of which one suggestive embodiment is illustrated in the accompanying drawing wherein—

Figure 1:
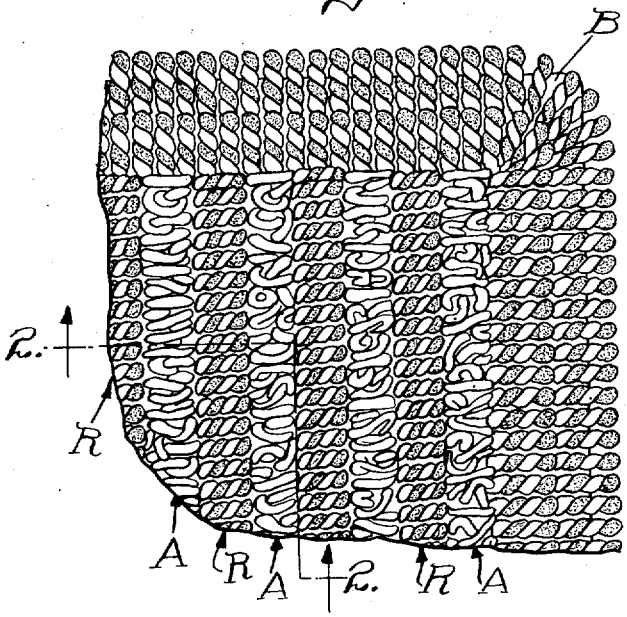
Figure 1 is a fragmentary top plan view of the rug.
Figure 2:
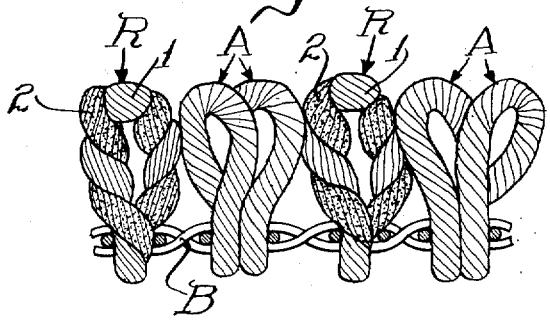
Fig. 2 is a greatly enlarged fragmentary view in section, taken on line 2—2 of Fig. 1.

The rug herein shown combines a backing B of canvas or the like with a plurality of tufts (either looped or cut to provide a pile) that are stitched through the backing or otherwise secured thereto. The tufts are desirably, although not necessarily, arranged according to a definite pattern, the rug illustrated having the tufts disposed in rows extending parallel with one of its edges.

The tufts used in the present rug are made preferably of yarn, but of two types having unlike properties, viz.: those, designated as A, which are relatively absorptive of the dye used for coloring the rug, and those designated R, which are relatively non-absorptive of such dye and hereinafter sometimes referred to as "resistant." The tufts made from absorptive yarns, type A, may conveniently be produced, in whole or in large part, from cotton, whereas the resistant tufts may consist largely of acetate rayon yarns 1 mixed, as by twisting, with viscose rayon yarns 2. In the pattern illustrated, the absorptive tufts occur in pairs, whereas the repellant tufts occur singly; the absorptive tufts in such an arrangement accordingly predominate in a 2 to 1 ratio. This is one of a number of ways of imparting to the face of the rug an attractive and distinctive appearance for reasons which will shortly be pointed out.

The word "rayon" as used herein, is the generic term for manufactured textile fiber or yarn produced chemically from cellulose, or with a cellulose base, and for thread or strands made therefrom. Such fibers or yarns are made according to various processes, one being known as viscose and another as acetate. The viscose yarns are produced from filaments made of regenerated cellulose xanthate, whereas acetate yarns are produced from filaments formed by a compound of cellulose and acetic acid which has been coagulated. A distinguishing and characteristic feature of the latter is its sheen or lustrous appearance; also one of its inherent properties is its resistance to, or non-absorptiveness of, dyes of the direct type which are commonly employed for the coloring of many fabrics, including rugs.

While it is possible to dye-treat the yarns before the rug is constructed, it is preferable from a manufacturing standpoint to do this after completion of the rug. At this time the rug is dipped or otherwise color-treated with dye of a desired color. In this operation the cotton and viscose yarns absorb the dye to the extent of being colored thereby; not so, however, the acetate rayon yarns which are relatively dye-resistant. As a result, when the dye treatment is completed, the effects upon the two types of yarn will be distinctly different. This is a feature of major importance in the production of the novel and attractive color effects which characterize this invention.

There are many optional variations in the construction of the rug, and also in the treatment of the yarns, which will still produce the novel visual effects that characterize the present rug. For example, in the illustrated construction the one set of tufts are made from viscose and acetate rayon yarns twisted together into [one] *a two* ply yarn. The tufts so produced have a very interesting color effect due to the fact that in places the dye has been absorbed to transfer its color to the yarn tufts, whereas in other places in the same tufts the dye has been resisted to the point of leaving intact the original lustrous color of the acetate rayon. By varying the proportions of the viscose and acetate rayon in the mixture which goes into one type of tufts, the visual effect will be altered, and it is even possible to omit the viscose rayon altogether so that the yarns will consist entirely of acetate rayon whereby all the tufts made therefrom will be sharply different in appearance from the cotton tufts in the same rug. Likewise acetate rayon strands may be twisted with cotton strands to produce a mixture in the other type of tufts, and the distinctive contrasting appearance resulting from dye absorption by one material and resistance by the other, will be readily apparent in the tufts so treated.

In the commercial manufacture of rugs embodying the features of this invention, a multiple needle tufting machine may be used. The operations will then proceed the same as with the manufacture of any other tufted rug, and when completed the dyeing operation will produce the novel effects hereinbefore described. Any desired pattern may be produced in the rug, and the yarns going to make up the pattern will comprise two types, absorptive and resistant, so that in the resulting effect the lustre or sheen from the acetate rayon yarns will stand out throughout the pattern.

The present rug is characterized by a subtle pattern resulting from the presence of the spots or marks of lustre or sheen throughout the pattern. The effect is entirely novel, and affects noticeably the design or texture of the rug. The presence of the acetate rayon along with other materials in the rug improves its texture because it tends to stand out by contrast in a way that would not be possible if only a single material or single type of material, such as cotton or cotton and viscose rayon, were used throughout.

The presence of the acetate rayon even though only in a small amount, tends to minimize the appearance resulting from use of cotton as the major element of the rug. The acetate rayon, when used in varying amounts, gives a distinctive design effect, it highlights the rug by its [contracting] *contrasting* lustre, it emphasizes the texture, it eliminates matting to a large extent, and, even where the amount of acetate rayon used is small in proportion to the cotton base, surprising visual effects are achieved. Acetate rayon should be regarded as an example of a dye-repellant material having an attractive appearance, lustrous or otherwise, that is admirably suited for use with the present rug. There may be a number of other materials equally serviceable for the same purpose. "Orlon" (a [du] *Du* Pont synthetic product) is another example, just to mention one more.

In the description throughout the specification, I have referred to cotton as the base material since it is one of the best known and most widely used in the construction of rugs. It is to be understood, however, that other materials, such as wool or various combinations which might include even nylon, rayon, etc., come within the purview of this invention, the gist of which is the presence of a dye-resistant lustrous material comprised in the strands which go to make up the tufts forming the over-all exposed surface of the work.

[Attached hereto, as Exhibit A, is a small-sized specimen of rug embodying the novel features of this invention.]

I claim:

1. A rug having a backing whereon are carried tufts of yarn of two types, one mainly cotton and the other a mixture of strands of viscose and acetate rayon twisted together into a [single] *two* ply yarn, [and both treated to a color dye which is readily absorbed into the cotton tufts but resisted by the acetate] *said cotton tufts and strands of viscose rayon containing a relatively large amount of a color dye and said acetate* rayon strands of the other set of tufts *containing relatively little of said color dye,* the color effects in the two sets of tufts varying according to the absorptive capacity of the two types of treated yarns and the strands of the rayon acetate producing spots of luster or sheen throughout the exposed face of the rug.

2. A rug having a backing whereon are carried tufts of yarn of two types, one mainly cotton and the other a mixture of strands of viscose and acetate rayon twisted together into a [single] *two* ply yarn, the cotton tufts being disposed in pairs and the mixture of strands of viscose and acetate rayon being formed into single tufts located between the pairs of cotton [tufts, and both tufts treated to a color dye which is readily absorbed into the cotton tufts but resisted] *tufts, said cotton tufts and viscose strands containing a relatively large amount of a color dye and said* [by the] acetate rayon strands of the other set of tufts *containing a relatively small amount of said color dye,* the color effects in the two sets of tufts varying according to the absorptive capacity of the two types of treated yarns.

[3. A rug having a backing whereon are carried tufts of yarn of two types, one mainly cotton and the other a mixture of strands of viscose and acetate rayon twisted together into a single ply yarn, the cotton tufts being disposed in pairs and the mixture of strands of viscose and acetate rayon being formed into single tufts located between the pairs of cottom tufts, and both tufts treated to a color dye which is readily absorbed into the cotton tufts but resisted by the acetate rayon strands of the other set of tufts, the color effects in the two sets of tufts varying according to the absorptive capacity of the two types of treated yarns and the strands of rayon acetate producing spots of luster or sheen throughout the exposed face of the rug.]

[4. A rug having a backing whereon are carried tufts of yarn of two types, one mainly cotton and the other a mixture of strands of viscose and acetate rayon twisted together into a single ply yarn, the cotton tufts being disposed in pairs and the mixture of strands of viscose and acetate rayon being formed into single tufts located between the pairs of cotton tufts, and both tufts treated to a color dye which is readily absorbed into the cotton tufts but resisted by the acetate rayon strands of the outer set of tufts, the color effects in the two sets of tufts varying according to the absorptive capacity of the two types of treated yarns and the strands of rayon acetate producing spots of luster or sheen throughout the exposed face of the rug producing a subtle pattern resulting from the presence of the lustrous spots and affecting noticeably the design and texture of the rug.]

5. *A rug having a backing whereon are carried tufts of yarn of two types, one being of a relatively dye absorptive material, and the other a mixture of strands of viscose and acetate rayon twisted together into a two ply yarn, said dye absorptive material and viscose rayon containing a rela-*

*tively large amount of a color dye and said acetate rayon strands containing relatively little of said color dye, the color effects in the two sets of tufts varying according to the absorptive capacity of the viscose rayon and said dye absorptive material and the strands of the rayon acetate producing spots of luster or sheen throughout the exposed face of the rug.*

*6. A rug having a backing whereon are carried tufts of yarns of two types, one being of a relatively dye absorptive material, and the other a mixture of strands of relatively dye absorptive material and relatively dye resistant material having a luster or sheen thereto twisted together into a two ply yarn, said dye absorptive materials having a relatively large amount of a color dye and said dye resistant material having a relatively small amount of said dye, the two sets of tufts varying according to the absorptive capacity of the dye absorptive materials therein and the strands of dye resistant material producing spots of luster or sheen throughout the exposed face of the rug.*

*7. A rug having a backing whereon are carried tufts of yarns of two types, one being a mixture of strands of relatively dye absorptive material and relatively dye resistant material twisted together into a two ply yarn, and the other being of a material having dye characteristics similar to one of the above materials, said dye absorptive material containing a relatively large amount of a color dye and said dye resistant material con-*

*taining relatively little of said color dye, the color effects in the two sets of tufts varying according to the absorptive capacity of the dye absorptive material therein.*

References Cited in the file of this patent or the original patent

UNITED STATES PATENTS

| Number | Name | Date |
|---|---|---|
| 1,816,766 | De Niederhausern | July 28, 1931 |
| 1,818,540 | Dreyfus | Aug. 11, 1931 |
| 1,838,663 | Dreyfus | Dec. 29, 1931 |
| 1,978,786 | Ellis | Oct. 30, 1934 |
| 2,020,698 | Platt | Nov. 12, 1935 |
| 2,048,796 | Kirk et al. | July 28, 1936 |
| 2,143,574 | Porter et al. | Jan. 10, 1939 |
| 2,178,744 | Ellis et al. | Nov. 7, 1939 |
| 2,212,744 | Masland, Jr. | Aug. 27, 1940 |
| 2,318,345 | Wadely et al. | May 4, 1943 |

FOREIGN PATENTS

| Number | Country | Date |
|---|---|---|
| 10,155 | Great Britain | July 12, 1888 |
| 191,120 | Great Britain | June 8, 1922 |
| 313,992 | Great Britain | June 21, 1929 |
| 316,504 | Great Britain | Aug. 1, 1929 |
| 316,982 | Great Britain | Aug. 7, 1929 |
| 323,180 | Great Britain | Dec. 23, 1929 |
| 324,877 | France | Dec. 27, 1902 |
| 741,642 | France | Dec. 13, 1932 |